US012577890B2

(12) United States Patent
Bougelet et al.

(10) Patent No.: US 12,577,890 B2
(45) Date of Patent: Mar. 17, 2026

(54) OIL TANK FOR A TURBOMACHINE WITH NEGATIVE-G-COMPATIBLE CYCLONIC CIRCULATION

(71) Applicants: SAFRAN AERO BOOSTERS, Herstal (BE); SAFRAN AIRCRAFT ENGINES, Paris (FR)

(72) Inventors: Stéphane Alain Luc Ghislain Bougelet, Herstal (BE); Sébastien Oriol, Paris (FR); Quentin Borlon, Herstal (BE)

(73) Assignees: SAFRAN AERO BOOSTERS, Herstal (BE); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/876,953

(22) PCT Filed: Jun. 21, 2023

(86) PCT No.: PCT/FR2023/000121

§ 371 (c)(1),
(2) Date: Dec. 19, 2024

(87) PCT Pub. No.: WO2023/247847

PCT Pub. Date: Dec. 28, 2023

(65) Prior Publication Data

US 2025/0376934 A1 Dec. 11, 2025

(30) Foreign Application Priority Data

Jun. 24, 2022 (EP) .................................... 22315128

(51) Int. Cl.
*F01D 25/18* (2006.01)
*F01M 11/00* (2006.01)

(52) U.S. Cl.
CPC ..... *F01D 25/18* (2013.01); *F01M 2011/0037* (2013.01); *F05D 2260/98* (2013.01)

(58) Field of Classification Search
CPC .................. F01D 25/18; F01M 11/067; F01M 2011/0037; F16H 57/0442; F16H 57/0443; F16H 57/045; F05D 2260/98
See application file for complete search history.

(56) References Cited

U.S. PATENT DOCUMENTS 10,077,788 B2 * 9/2018 Xiong ....................... F15B 1/04
2003/0059294 A1 * 3/2003 Olsen ...................... F01D 25/20
415/110

(Continued)

FOREIGN PATENT DOCUMENTS

EP 1104742 A1 6/2001
EP 2801707 A1 * 11/2014 ............. F01D 25/18

(Continued)

OTHER PUBLICATIONS

International Search Report for PCT/FR2023/000121, dated Jun. 21, 2023, 2 pages.

*Primary Examiner* — Minh Truong
(74) *Attorney, Agent, or Firm* — RANKIN, HILL & CLARK LLP

(57) ABSTRACT

An oil tank for an aircraft turbomachine, including: a main enclosure capable of containing the oil, an oil inlet mixed with air, an oil outlet, an auxiliary enclosure arranged inside the main enclosure, including an enclosing wall, and two end walls adjacent to the enclosing wall, at least one of the two end walls including at least one oil passage with the interior of the main enclosure, at least one auxiliary inlet opening tangentially to the enclosing wall and passing through the main enclosure, an auxiliary outlet, tangential to a larger diameter section of the surrounding wall. The (Continued)

auxiliary outlet passes through the main enclosure for connection to the auxiliary circuit.

17 Claims, 5 Drawing Sheets

(56) References Cited

U.S. PATENT DOCUMENTS

| | | | | |
|---|---|---|---|---|
| 2010/0065374 | A1* | 3/2010 | Szolomayer | F01M 11/067 700/282 |
| 2014/0000721 | A1* | 1/2014 | McCune | F01D 25/20 137/1 |
| 2017/0175874 | A1* | 6/2017 | Schwarz | F16H 57/0479 |
| 2019/0316672 | A1* | 10/2019 | Davies | F16H 57/0479 |
| 2019/0338670 | A1* | 11/2019 | Reid | B01D 19/0057 |

FOREIGN PATENT DOCUMENTS

| | | | |
|---|---|---|---|
| EP | 3674552 | A2 | 7/2020 |
| FR | 2621562 | A1 | 4/1989 |
| FR | 3010133 | A1 | 3/2015 |
| FR | 3107319 | A1 | 8/2021 |

* cited by examiner

[Fig 1]
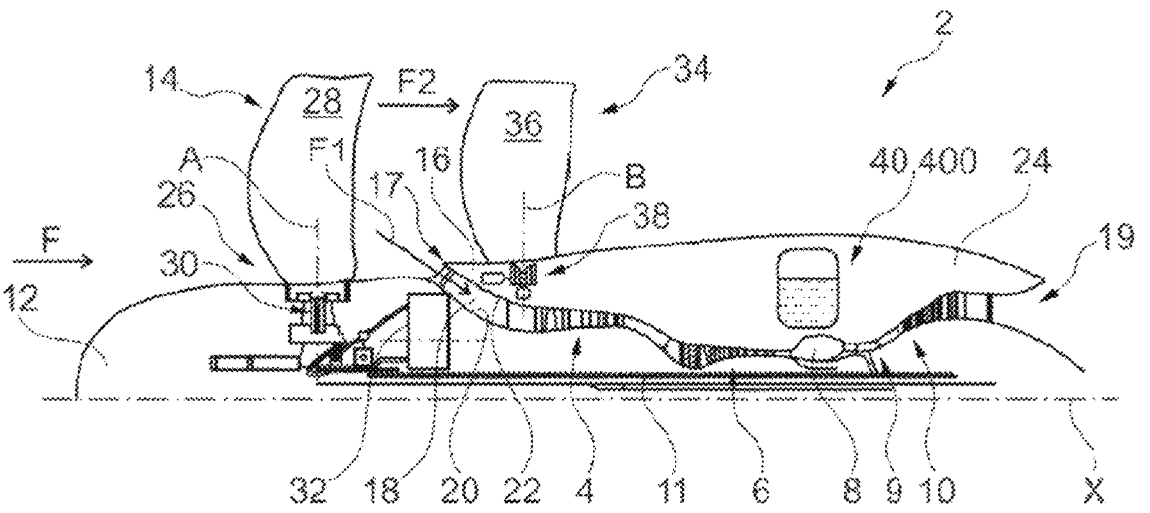
[Fig 2]
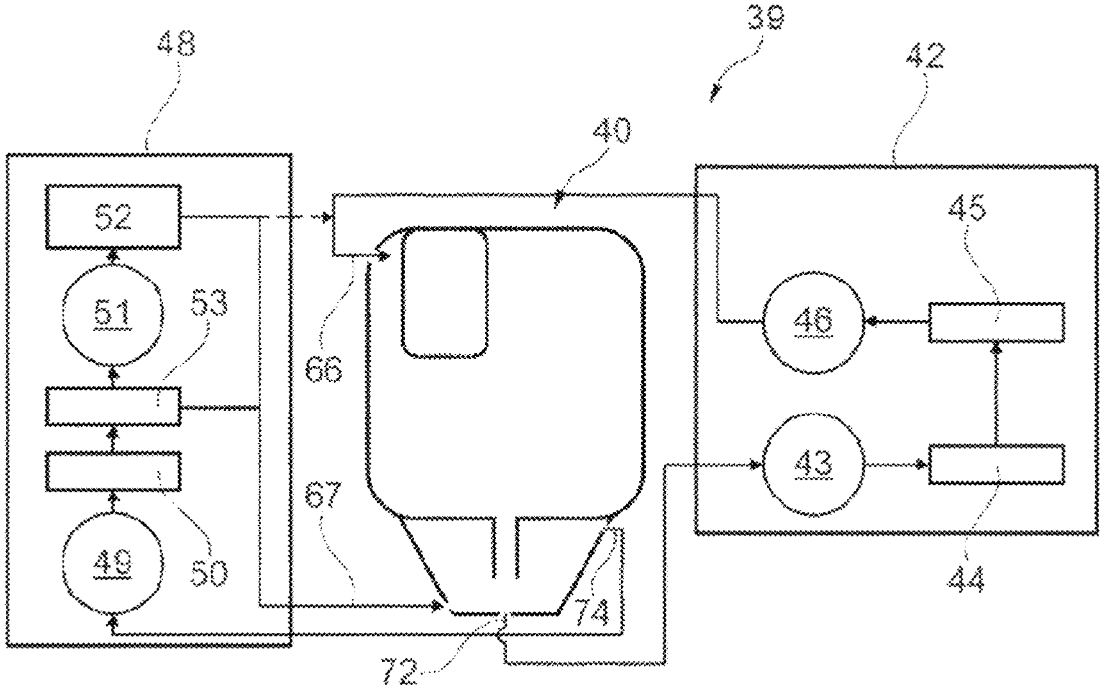

[Fig 3]
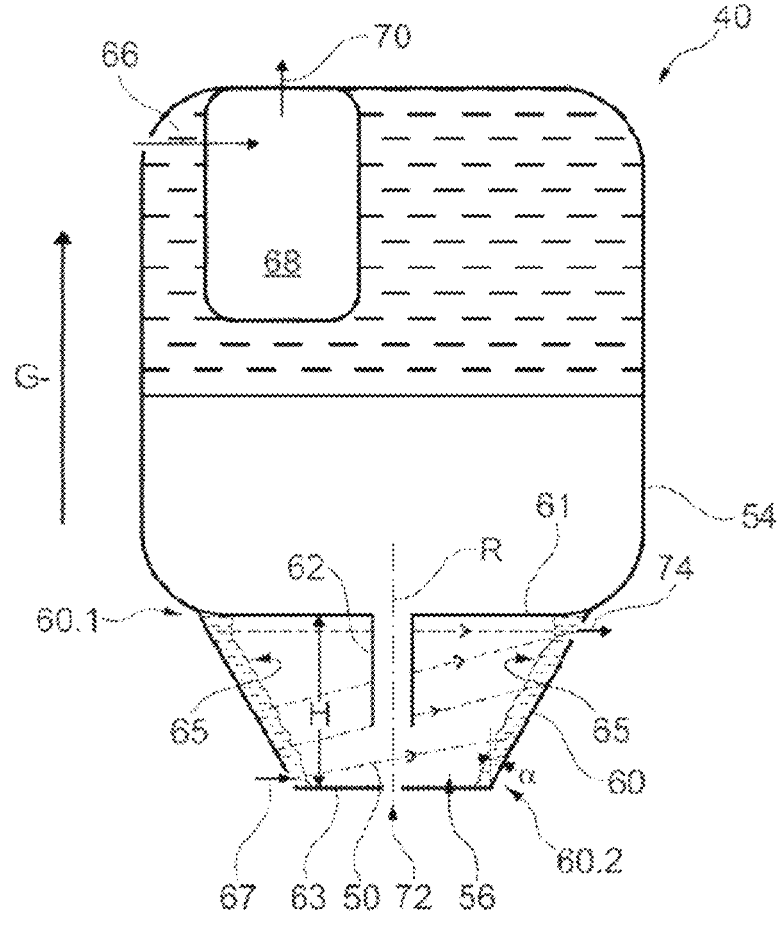

[Fig 4]
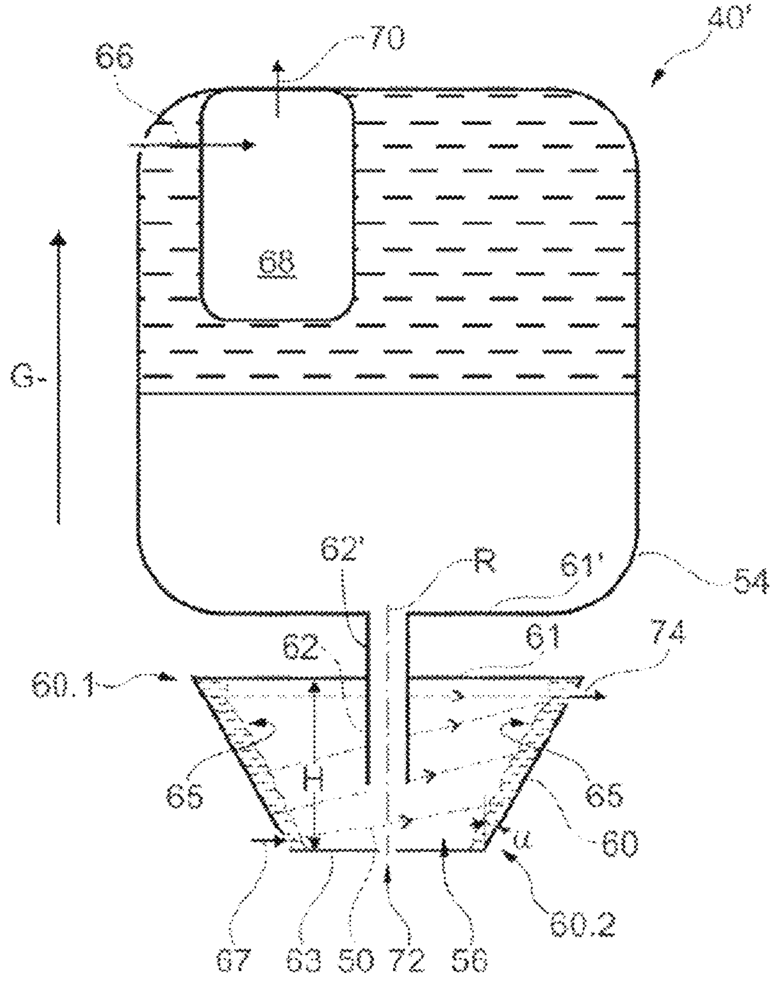

[Fig 5]
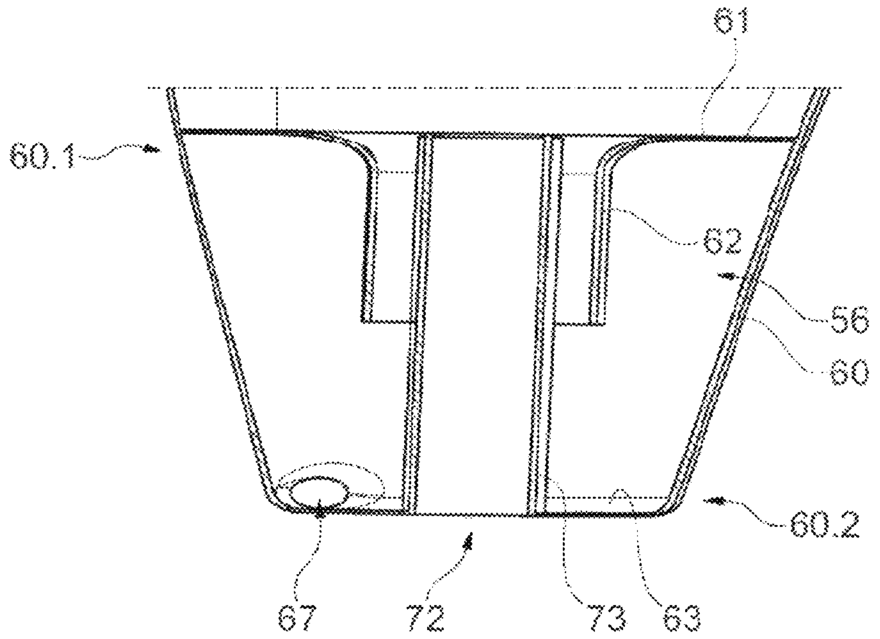
[Fig 6]
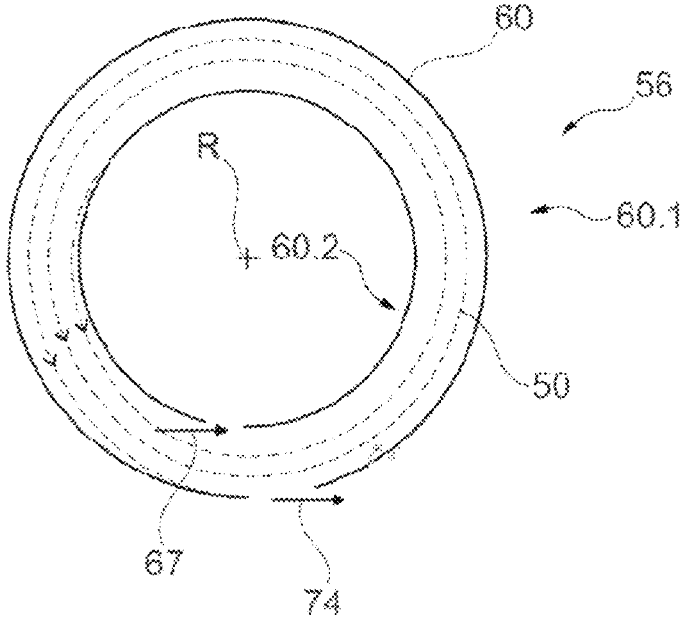

[Fig 7]
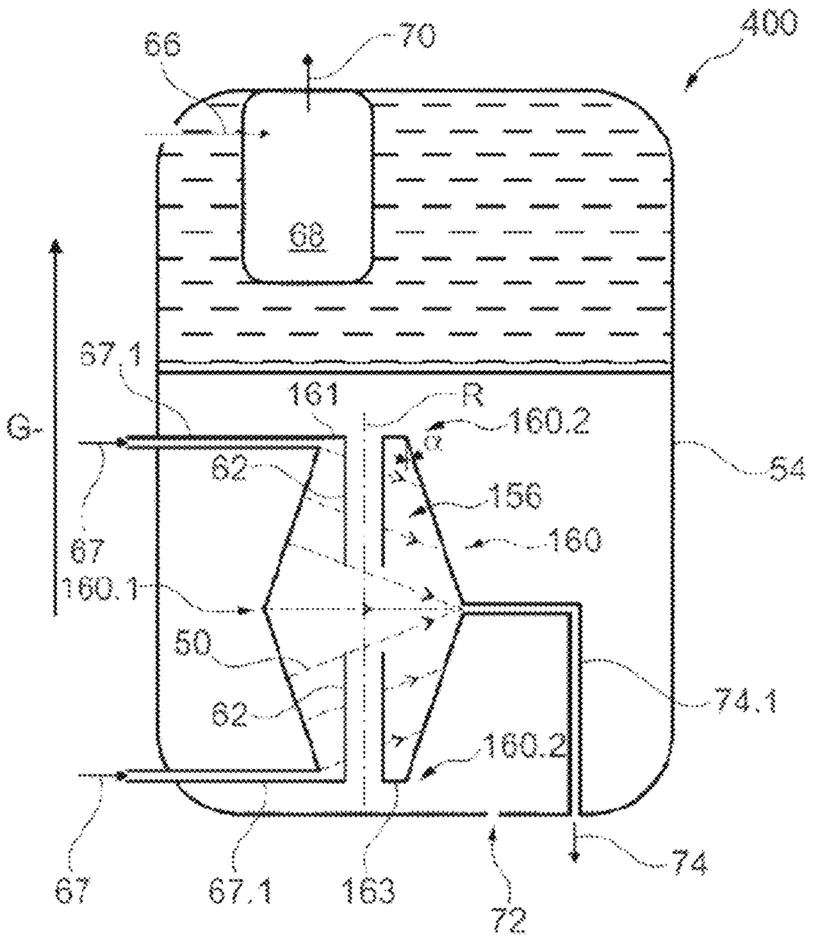

OIL TANK FOR A TURBOMACHINE WITH NEGATIVE-G-COMPATIBLE CYCLONIC CIRCULATION

DOMAIN

The invention relates to the field of turbomachine tanks. More specifically, the invention relates to the field of oil tanks used to lubricate turbomachine components, in particular comprising an unducted variable-pitch propeller. and/or a variable pitch rectifier.

PRIOR ART

Aircraft turbomachines comprising at least one unducted propeller are known by the English term "open rotor" or "unducted fan". In this category of turbomachine, there are those which have two unducted and counter-rotating propellers (known by the English acronym UDF for "Unducted Dual Fan") or those having a single unducted propeller and a rectifier comprising several stator blades (known by the English acronym USF for Unducted Single Fan).

These turbomachines are distinguished by the use of a propeller outside the nacelle (unducted) instead of an internal fan.

The propeller or propellers forming the propulsion part generally comprise a system for actuating the pitch of the blades of the propeller(s), also referred to as a variable pitch system. Such a system allows the blades of the propeller to be oriented according to the needs of the flight phases of the aircraft (takeoff, cruise, landing, etc.) in order to ensure thrust management in all flight cases of the turbomachine.

In the case of turbomachines with a single unducted propeller and a rectifier, the latter may also comprise a variable-pitch system so as to improve the performance of the turbomachine. An example of such a turbomachine is disclosed by published patent document FR 3 107 319 A1.

Variable pitch systems may require a permanent oil supply to enable the blade pitch to be actuated and the engine thrust to be managed in all flight conditions of the turbomachine (nominal and extreme). In the state of the art, these systems are supplied by a main lubrication circuit to ensure an oil supply to the various components of the engine (bearings, reducer, etc.) to provide lubrication and/or cooling functions. This circuit is supplied with oil by a main tank of the turbomachine comprising, among other things, an oil inlet in the upper part and an outlet in the lower part, which allows an oil supply during flight attitudes under gravity or positive load factor (positive G).

While such tanks are entirely satisfactory when the aircraft is flying in positive G flight situations, on the other hand, when it comes to flight phases under zero or negative load factor (zero G or negative G), i.e., when the aircraft is manoeuvring or in the event of an upward gust of wind, these tanks no longer completely ensure the oil supply to the pitch actuation system.

Indeed, zero-G or negative-G flight phases are temporary flight phases (generally lasting less than 30 seconds for civil aircraft) for which the aircraft is subjected to negative accelerations, for example, when it experiences sudden decreases in altitude.

To this end, the oil contained in the main tank is then spilled, the oil is no longer located near the outlet in the lower part, which generates a cut in the oil supply, causing air to pass towards the variable pitch circuit(s), thus causing harmful consequences on the operation of the turbomachine which may lead to a loss of control of the aircraft.

It is possible to use tanks such as those used in fighter aircraft, where negative G flight phases are frequent and essential. However, these tanks are pressurized, which implies a significant excess weight, as well as a high additional cost, incompatible with turbomachines comprising at least one unducted propeller.

Furthermore, a known solution to avoid harming the propeller pitch actuation circuit is, in the case of negative G, to ensure the oil supply by means of a system other than the main oil tank of the turbomachine. However, such a solution involves significant bulk and mass within the turbomachine and complex management of the oil routing to the variable pitch system.

The published patent document FR 3 010 133 A1 discloses a tank comprising an inclined partition provided at its ends with through holes for continuous supply of the turbomachine. However, the solution proposed by the document has room for improvement in order to allow, for example, a greater volume of oil available to supply the components of the turbomachine in the event of negative G flight, and without hindering said volume when returning to positive G.

SUMMARY OF THE INVENTION

Technical Problem

The present invention aims to overcome at least one of the drawbacks of the aforementioned state of the art. More particularly, the invention aims to propose an oil tank whose design is such that it allows the aircraft to carry out, in complete safety, temporary phases of flight in negative gravity, without increasing the weight and cost of the tank.

Technical Solution

The invention relates to an oil tank for an aircraft turbomachine, comprising:

- a main enclosure capable of containing the oil; —an inlet for oil mixed with air, arranged on the main enclosure; —an oil outlet, arranged on the main enclosure;
- wherein the oil tank further comprises:—an auxiliary enclosure arranged inside the main enclosure, comprising an enclosing wall, and two end walls adjacent to said enclosing wall, at least one of the two end walls comprising at least one oil passage with the interior of the main enclosure,
- at least one auxiliary inlet opening tangentially to the enclosing wall and passing through the main enclosure for connection to an auxiliary circuit;
- an auxiliary outlet, tangential to a larger diameter section of the enclosing wall, said auxiliary outlet passing through the main enclosure for connection to the auxiliary circuit.

The flow of oil from the at least one auxiliary inlet to the auxiliary outlet allows the oil to flow in a spiral path and thus to be subjected to centrifugal forces stabilizing the flow. This flow is stabilized in particular at the auxiliary outlet so that the latter is constantly supplied with oil.

According to an advantageous embodiment of the invention, the enclosing wall is integrally formed with the main enclosure, and said enclosing wall preferably comprises a conical circular shape.

According to an advantageous embodiment of the invention, the at least one auxiliary inlet opens tangentially to a smaller diameter section of the surrounding wall.

According to an advantageous embodiment of the invention, the at least one oil passage is in a central position on the corresponding end wall.

According to an advantageous embodiment of the invention, the at least one oil passage comprises a channel extending axially from the corresponding end wall inside the auxiliary enclosure.

According to an advantageous embodiment of the invention, the at least one channel extends over at least 30% or 20% of a total axial extent of the auxiliary enclosure.

According to an advantageous embodiment of the invention, the at least one auxiliary inlet is close to one of the two end walls.

According to an advantageous embodiment of the invention, the auxiliary outlet is close to one of the two end walls.

Preferably, the expression "in the vicinity of" means that the at least one auxiliary inlet and/or the auxiliary outlet is at any location of a quarter of the surrounding wall adjacent to one of the two end walls (along the main axis), i.e., the at least one auxiliary inlet and/or outlet may be attached to one of the two end walls, or at most 25% away from one of the two end walls.

According to an advantageous embodiment of the invention, the enclosing wall has a taper angle between 0° and 50°.

According to an advantageous embodiment of the invention, the enclosing wall includes a single taper.

According to an advantageous embodiment of the invention, the enclosing wall comprises two opposing conicities, with the auxiliary outlet located at a boundary between the two conicities.

According to an advantageous embodiment of the invention, the at least one auxiliary inlet comprises an auxiliary inlet at each of the two axial ends of the enclosing wall.

According to an advantageous embodiment of the invention, at least 80% of a volume of the auxiliary enclosure is located in a lower half of the main enclosure, when the oil tank is oriented in a normal mounting position.

According to an advantageous embodiment of the invention, the enclosing wall has a main axis coaxial with the channel or inclined by less than 45° with respect to said channel.

Preferably, the normal mounting position of the tank corresponds to a position in which the main enclosure is located above the auxiliary enclosure in the direction of gravity (force perpendicular to the horizontal and directed downwards). For this purpose, the main enclosure, the auxiliary enclosure and the channel may be inclined during mounting on the turbomachine or may have particular shapes. For example, the main enclosure is preferably substantially cylindrical, but may have a substantially oblong and/or curved shape.

The invention also relates to a hydraulic system for an aircraft turbomachine comprising:

an oil tank; —a lubrication circuit for the turbomachine, hydraulically connected to the oil tank; —a hydraulic control circuit for at least one hydraulic actuator, hydraulically connected to the oil tank; wherein the oil tank is according to the invention, the lubrication circuit being hydraulically connected to the inlet of oil mixed with air and to the oil outlet, the hydraulic control circuit being hydraulically connected to the at least one auxiliary inlet and to the auxiliary outlet.

The invention also relates to a turbomachine comprising:

an unducted propeller propelling an incoming air flow, said propeller comprising variable-pitch blades actuated by at least one hydraulic actuator;

a hydraulic system capable of ensuring lubrication of the turbomachine and of controlling the at least one hydraulic actuator;

wherein the hydraulic system is according to the invention.

The invention also relates to a turbomachine comprising:

an unducted propeller propelling an incoming air flow, said propeller comprising a variable pitch system for actuating the pitch of the propeller blades;

an oil tank for lubricating components of the turbomachine, wherein said tank comprises:

a main enclosure capable of containing the oil; —an inlet for oil mixed with air, arranged on the main enclosure; —an oil outlet, arranged on the main enclosure; —an auxiliary enclosure arranged inside the main enclosure, comprising an enclosing wall, and two end walls adjacent to said enclosing wall, at least one of the two end walls comprising at least one oil passage with the interior of the main enclosure;

at least one auxiliary inlet opening tangentially to a smaller diameter section of the enclosing wall and passing through the main enclosure for connection to an auxiliary circuit;

an auxiliary outlet, tangential to a larger diameter section of the surrounding wall, said auxiliary outlet passing through the main enclosure for connection to the auxiliary circuit.

According to an advantageous embodiment of the invention, the variable pitch system is a first variable pitch system, and said turbomachine further comprises a rectifier comprising a plurality of stator blades. extending from a fixed casing, said rectifier comprising a second variable pitch system, and in that the auxiliary output is hydraulically connected to a second closed circuit comprising components of the first system and/or the second variable pitch system of the turbomachine.

Advantages of the Invention

The invention is particularly advantageous in that it makes it possible to guarantee an oil supply to the various components of the turbomachine, including in particular the hydraulic control system(s) of at least one hydraulic actuator, in this case the variable pitch system(s), while ensuring that the latter is/are supplied with oil without any presence of air and without interruption of supply during the flight phases in zero gravity and in negative gravity. Thus, the hydraulic control of the propeller pitch actuation system of the turbomachine can remain operational during all flight phases of the aircraft.

Advantageously, the simplicity of the architecture of the oil tank of the present invention allows it to ensure reliable operation. In addition, the tank is compact, which makes it possible to reduce the overall size and mass of the turbomachine.

DESCRIPTION OF THE DRAWINGS

FIG. 1 is a schematic view in longitudinal section of an aircraft turbomachine according to the invention;

FIG. 2 illustrates a diagram of a hydraulic system of the turbomachine of FIG. 1;

FIG. 3 represents a sectional view of an oil tank according to a first embodiment of the invention during a flight phase of the aircraft in negative gravity;

FIG. 4 shows a sectional view of an alternative to the oil tank of FIG. 3;

FIG. 5 illustrates a sectional view of a variant of an auxiliary enclosure of the tank of FIG. 3;

FIG. 6 is a diagram of a top view of an enclosing wall from the oil tank of FIG. 3;

FIG. 7 represents a sectional view of an oil tank according to a second embodiment of the invention during a flight phase of the aircraft in negative gravity.

DETAILED DESCRIPTION

The figures show the elements schematically and are not drawn to scale. In particular, some dimensions are enlarged to facilitate reading of the figures.

FIG. 1 schematically illustrates a longitudinal sectional view of an aircraft turbomachine according to the invention. This is a turbomachine known by the English expression "open rotor" or "unducted fan", and particularly a USF "Unducted Single Fan" turbomachine.

In the following description, the terms "internal" and "external" refer to a positioning relative to the axis of rotation of a turbomachine, and here along the longitudinal axis X (and even from left to right in FIG. 1). The terms "radial", "internal" and "external" are defined relative to a radial direction perpendicular to the longitudinal axis X. Upstream and downstream refer to the direction of flow of a flow in the turbomachine. Furthermore, the elements illustrated in the figures which are identical or substantially identical and/or with the same functions are represented by the same numerical references.

The turbomachine 2 typically comprises, from upstream to downstream, a first compression level, called low pressure compressor 4, as well as a second compression level, called high pressure compressor 6, a combustion chamber 8 followed by a high pressure turbine 9 and a low pressure turbine 10.

The turbomachine 2 comprises a propeller 14 arranged upstream of a separation nozzle 16 carried by an external casing 24 and capable of separating the air flow F into a secondary flow F2 and a primary flow F1 circulating in a primary vein 18 and crossing the various aforementioned levels of the turbomachine 2.

The primary vein 18 is delimited radially by a radially internal wall 20 and a radially external wall 22. The radially internal wall 20 is carried by the internal casing 12. The radially external wall 22 is carried by the external casing 24. The primary air flow F1 enters the primary vein 18 through an annular air inlet 17 and escapes through a primary nozzle 19 which is arranged downstream of said primary vein 18. The primary flow F1 can be accelerated by the primary nozzle 19 so as to generate a thrust reaction necessary for the flight of the aircraft.

The turbomachine comprises a rotating casing 26 centered on the longitudinal axis X and rotating around the latter. The rotating casing 26 carries a crown of movable blades 28 forming the propeller 14. The rotating casing 26 is mounted movable relative to the internal casing 12 which carries it.

The air flow F entering the turbomachine passes through the blades 28 of the propeller 14 to form the secondary air flow F2. The latter circulates around the external casing 24. Each blade 28 of the propeller 14 comprises a root 30 and an aerodynamic part extending radially outwards from the root 30, the latter comprising a pivot. Indeed, the root 30 is mounted pivoting about an axis A (perpendicular to X) thus allowing the blades 28 of the propeller 14 to pivot. This pivoting is managed by a first variable-pitch system of the turbomachine 2.

The low pressure compressor 4 and the low pressure turbine 10 are mechanically connected by a low pressure shaft 11, the latter drives the propeller 14 via a reducer 32, the propeller 14 compresses the air outside the external casing 24 and provides most of the thrust of the turbomachine 2. The reducer 32 may be of the planetary gear type.

The turbomachine 2 comprises a rectifier 34 crossed by the secondary flow F2, the latter being a part of the air flow F propelled radially outwardly to the longitudinal axis X. The rectifier 34 comprises a plurality of stator blades 36 (or stator blades or fixed blades) known by the English acronym "OGV" (Outlet Guide Vane). The stator blades 36 are distributed regularly around the longitudinal axis X and extend radially in the secondary air flow F2. The stator blades 36 are carried by a fixed structure secured to the external casing 24. In particular, each stator blade 36 extends radially from a foot 38, the latter is pivotally mounted about an axis B (perpendicular to X) allowing the stator blades 36 of the rectifier 34 to pivot. This pivoting is managed by a second variable-pitch system of the turbomachine 2.

The turbomachine 2 further comprises an oil tank 40, 400 for the lubrication and/or cooling of the components of said turbomachine 2. For this purpose, the oil tank 40, 400 is the main oil tank of the turbomachine 2, and also makes it possible to supply oil to the first and second variable pitch systems of the turbomachine 2. Preferably, the tank 40, 400 is arranged in line with the external casing 24. The architecture and operation of the oil tank 40, 400 will be detailed later in this description.

Alternatively, the oil tank 40, 400 of the present invention is capable of supplying oil to a turbomachine comprising a variable pitch system only at the rectifier (having a fixed-blade propeller without a variable pitch system).

FIG. 2 is a diagram of a hydraulic system 39 of the turbomachine of FIG. 1. The hydraulic system 39 comprises different closed circuits connected to the oil tank of the invention so as to ensure lubrication of the turbomachine.

With reference to FIG. 2, the oil tank 40 is hydraulically connected to a lubrication and cooling circuit 42 of the turbomachine engine, this circuit comprises a feed pump 43, exchangers 44 and engine enclosures 45, the latter ensuring the lubrication of the bearings, reducers and bearings and ensuring the air/oil seal of the engine.

FIG. 2 illustrates the tank 40 according to a first embodiment, but the hydraulic system 39 can also comprise an oil tank 400 according to a second embodiment illustrated in FIG. 7. These two embodiments will be detailed in detail later in this description.

The lubrication circuit 42 further comprises at least one recovery pump 46 configured to recover the oil from the engine enclosures 45 and direct them to the oil tank 40. The circuit 42 may correspond to a lubrication group of the turbomachine.

The oil tank 40 is also hydraulically connected to a circuit 48 for actuating the pitch of the propeller blades, also designated by a hydraulic control circuit 48 for supplying oil to the first variable-pitch system of the turbomachine of FIG. 1, namely the propeller 14.

The hydraulic control circuit 48 can also supply oil to the second variable pitch system of the turbomachine of FIG. 1, namely the rectifier 34, independently or in combination with the first variable pitch system.

The hydraulic control circuit 48 can provide lubrication and/or cooling functions for the variable pitch system. In this regard, the circuit 48 comprises a booster pump 49 recovering the oil from a lower part of the tank 40 to direct it to an exchanger 50, more precisely, the booster pump 49 recovers the oil contained in an auxiliary enclosure of the tank 40 which will be detailed later in this description.

Preferably, the hydraulic control circuit 48 is also configured to hydraulically control the variable pitch system in addition to the lubrication and cooling functions. In this regard, the circuit 48 comprises a pitch actuation pump 51 capable of hydraulically controlling a pitch actuation system or a hydraulic actuator 52, the latter of which may correspond to the first and/or second variable pitch system of the turbomachine.

In this configuration, the step actuating pump 51 makes it possible to actuate the hydraulic actuator 52 causing the pivoting of the feet 30 and 38 of FIG. 1.

Preferably, the hydraulic control circuit 48 comprises a by-pass valve 53 allowing the choice between a cooling function or actuation of the pitch of the variable pitch system.

The circuit 48 comprises at least one oil return to the tank 40, 400, this oil return is preferably accelerated by at least one of the pumps (49 and/or 51).

Advantageously, the hydraulic system 39 comprises a connection (illustrated in dotted lines) between the hydraulic control circuit 48 and the lubrication circuit 42 to collect any leaks from the propeller pitch actuation cylinders and to reinject this oil into the tank 40 from an inlet 66.

FIG. 3 shows a sectional view of an oil tank 40 according to a first embodiment of the invention during a flight phase of the aircraft in negative G. Now, G+ will refer to positive gravity and G− to negative gravity.

It should be noted that the tank 40 is capable of ensuring a constant supply of oil during G− flight phases, and each of the G− phases lasts between a fraction of a second and 45 seconds. Advantageously, the tank 40 can be sized so as to ensure a constant supply of oil even beyond 45 seconds.

In this regard, the oil tank 40 comprises an oil inlet 66 mixed with air to a main enclosure 54 capable of containing the oil, and specifically to an oil deaerator device 68, making it possible to evacuate the air 70 mixed with the oil at the oil inlet 66. The oil inlet 66 preferably comes from the at least one recovery pump 46 of FIG. 2.

The tank 40 comprises an auxiliary enclosure 56 arranged inside the main enclosure 54, and comprises an enclosing wall 60 with two end walls 61, 63 adjacent to said enclosing wall. 60.

Advantageously, the arrangement of the auxiliary enclosure 56 inside the main enclosure 54 makes it possible to obtain a rapid exchange of the oil flows between the latter two.

However, in an alternative (shown in FIG. 4), the auxiliary enclosure 56 is arranged externally to the main enclosure 54 so as to be able to integrate the tank 40' in a particularly restrictive environment of the turbomachine. In this regard, one or more hydraulic pipes 62' can connect the two enclosures 54 and 56. In this configuration, the hydraulic pipe(s) 62' can be flexible and/or be merged with a channel 62.

It can be seen in FIG. 4 that the main enclosure 54 of the tank 40' comprises an end wall 61' corresponding to a bottom wall 61' of the main enclosure 54. The latter can advantageously have a conical shape so as to facilitate the circulation of oil towards the channel 62 during the return to G+.

With reference to FIG. 3, the enclosing wall 60 preferably corresponds to a conical circular wall 60 making it possible to generate a circular and accelerated flow of the oil within the auxiliary enclosure 56. Such a flow will be detailed in the present description.

Alternatively, the enclosing wall 60 may comprise a different shape depending on the integration conditions and/or the operating conditions of the turbomachine. For example, the enclosing wall 60 may comprise a cylindrical or elliptical shape in order to facilitate the integration of the tank 40 in a more constrained environment.

The tank 40 also includes an oil outlet 72 preferably arranged in line with the end wall 63 in the auxiliary enclosure 56.

In this configuration, the oil inlet 66 and the oil outlet 72 form a circuit corresponding to the lubrication circuit 42 of FIG. 2.

Alternatively, the oil outlet 72 may also be located on a side wall of the main enclosure 54.

It is preferable that the surrounding wall 60 of the tank 40 is integrally formed with the main enclosure 54, this allows space saving. However, it is possible that the enclosing wall 60 is included in the auxiliary enclosure 56 at a distance from the side walls of the auxiliary enclosure 56.

It can also be seen in FIG. 3 that the two end walls 61, 63 are formed with the enclosing wall 60, but these walls 61 and 63 can also be at a distance from the enclosing wall 60 by being for example formed with side walls of the main enclosure 54.

The end wall 61 is an upper end wall 61, following the direction of gravity (perpendicular to the horizontal plane), and arranged in a section of larger diameter 60.1 of the enclosing wall 60. In parallel, the end wall 63 is a lower end wall 63 arranged in a smaller diameter section 60.2 of the surrounding wall 60.

The upper end wall 61 comprises an oil passage comprising a channel 62 which extends axially (along a main axis of said channel) inside the auxiliary enclosure 56 and over at least 20% of the total axial extent of the auxiliary enclosure 56, and up to at least 99% of said total extent, this channel 62 allows the oil to reach the oil outlet 72 at G+. Preferably, the channel 62 extends over 30% to 95% of the total axial extent of the auxiliary enclosure 56, and more preferably extends over 30% to 70% of said axial extent.

Preferably, the channel 62 is in a central position of the upper end wall 61 and opposite the oil outlet 72. Advantageously, this allows the oil to quickly reach the outlet 72 when returning to G+ after G−.

In an alternative not shown, the upper end wall 61 may have a conical shape so as to facilitate the circulation of oil towards the channel 62 during the return to G+.

Advantageously, the channel 62 allows thermal expansion of the oil using the buffer volume (auxiliary enclosure 56) of the main tank 40. In addition, the channel 62 allows the oil which is lost at the level of the leaks of the propeller pitch actuation cylinders to be reinjected into the auxiliary circuit (circuit 48 of FIG. 2).

The tank 40 further comprises an auxiliary inlet 67 passing through the main enclosure 54 and close to the lower end wall 63, this auxiliary inlet 67 opens tangentially to the section 60.2.

The auxiliary inlet 67 corresponds to an oil return from the hydraulic control circuit 48 of FIG. 2. Indeed, the auxiliary inlet 67 is configured to project the accelerated oil from the hydraulic control circuit towards the enclosing wall 60 so as to generate a cyclonic movement or a circular flow of the oil 65 on the enclosing wall 60. Such a movement makes it possible to rotate all of the oil in the auxiliary enclosure in order to overcome gravity and reach an auxiliary outlet 74 during all phases of flight of the aircraft (G+ and G0 and G−)

In fact, the oil sprayed on the surrounding wall 60 preferably comprises an acceleration of at least 3 g (g being the acceleration of gravity in m/s 2) and may, for example, correspond to 6 g. Indeed, the acceleration of the oil projected at the auxiliary inlet 67 may exceed 6 g depending on the need and the operating conditions.

Similar to auxiliary inlet 67, auxiliary outlet 74 is also tangential to the enclosing wall. 60, and precisely to the section of larger diameter 60.1 of said wall 60. In this regard, the auxiliary outlet 74 passes through the main enclosure 54 in order to join the hydraulic control circuit 48 of FIG. 1.

Advantageously, each of the sections of smaller diameter 60.2 and larger diameter 60.1 of the enclosing wall 60 corresponds to less than 50% of a total height H of the auxiliary enclosure 56, and preferably corresponds to 25% of the height H.

In the configuration illustrated in FIG. 3, each of the auxiliary inlet 67 and the auxiliary outlet 74 is adjacent to the corresponding end wall 61, 63. However, the auxiliary outlet 74 may be moved closer to the auxiliary inlet 67 and vice versa.

Preferably, the cyclonic movement of the oil 65 on the enclosing wall 60 makes it possible to expect an acceleration of the oil at the auxiliary outlet 72 which is approximately 5 g (in the example described). This value makes it possible to secure the continuous supply of oil to the hydraulic control circuit during all phases of flight of the aircraft.

The G− event illustrated in FIG. 3 shows that the oil 65 remains pressed against the surrounding wall 60, this plating can be achieved by a centrifugal force induced at least in part by a conicity angle of the enclosing wall 60.

The enclosing wall 60 has a main axis R corresponding to the main direction of the extent of said wall 60. For this purpose, the main axis R defines the direction of the largest dimension of the enclosing wall 60 (the height H).

Preferably, the main axis R is coaxial with the channel 62, or inclined by less than 30° relative to said channel 62. However, the inclination of the main axis R relative to the channel 62 can be up to 45° or exceed 45° to form an angle of less than 90° with the channel 62.

Preferably, the main axis R follows the direction of gravity (perpendicular to the horizontal). However, the main axis R may be inclined relative to the direction of gravity by an angle of up to 45° or exceed 45° to form an angle of less than 90° with said direction of gravity.

Preferably, the wall 60 of the tank 40 has a single conicity identified by a conicity angle $\alpha$ between 0° (cylindrical wall 60) and 50°, and being preferentially between 20° and 45°, and being even more preferentially equal to 30°. The conicity angle $\alpha$ is presented between the enclosing wall 60 and the main direction.

Furthermore, the upper end wall 61 may comprise a valve (not shown) or a flap sensitive to changes in gravity and making it possible to retain the oil in the auxiliary enclosure 56 at G− and to accelerate the return of oil to said enclosure at G+.

In addition, the upper end wall 61 may further comprise at least one vent (not shown) for rapidly evacuating air from the auxiliary enclosure 56 in order to allow rapid return of the oil to said auxiliary enclosure 56 when the aircraft returns to G+ after G−.

The enclosure 54 may include a perforated baffle (not shown) arranged above the upper end wall 61 and making it possible to filter and purify the oil before the latter reaches the auxiliary enclosure 56 at G+.

FIG. 5 illustrates a sectional view of a variant of the enclosure 56 of FIG. 3, in which at the right of the end wall

63, the oil outlet 72 comprises a tube 73 extending to the inside of the channel 62 and concentrically thereto. Advantageously, this makes it possible to prioritize the filling of the auxiliary enclosure 56 in order to always ensure an oil supply and a rapid return of the oil to the outlet 72 during a return to G+ after G−.

FIG. 6 is a schematic of a top view of the enclosing wall. 60 of the oil tank in FIG. 3.

The tangential orientations of the auxiliary inlet 67 and the auxiliary outlet 74 can be clearly distinguished. Advantageously, this tangential orientation of the auxiliary inlet and outlet 67, 74 makes it possible to limit the friction that may occur between the viscous oil and the surrounding wall. 60. Advantageously, this orientation makes it possible to maintain the speed of the oil on the surrounding wall as much as possible. 60 so that the oil can have the trajectory 50 allowing it to quickly reach the auxiliary outlet 74

It is possible that the trajectory 50 may be defined by grooves formed in the enclosing wall 60.

FIG. 7 shows a sectional view of an oil tank 400 according to a second embodiment of the invention during a flight phase of the aircraft in G−.

Elements identical to those in the first embodiment are represented by the same reference numerals, and elements exhibiting a difference will be represented with an increment of 100.

Referring to FIG. 7, the tank 400 comprises an enclosing wall 160 this time having two opposite conicities. In this configuration, the enclosing wall 160 comprises two smaller diameter sections 160.2 each comprising an upper 161 and lower 163 end wall, and a larger diameter section 160.2 corresponding to a boundary between the two conicities, said boundary 160.2 preferably being devoid of a wall.

The enclosing wall 160 delimits an auxiliary enclosure 156 inside the main enclosure 54. For this purpose, at least 80% of a volume of the auxiliary enclosure 156 is inside the main enclosure, and preferably, the entire volume of the auxiliary enclosure 156 is inside the main enclosure 54.

Preferably, the enclosing wall 160 is integrally formed with the enclosure 54. For this purpose, said wall 160 is connected to the enclosure by means of the rigid tubes 67.1 and 74.1 respectively forming the auxiliary inlet 67 and outlet 74. However, these tubes 67.1, 74.1 may be flexible and the enclosing wall 160 may be rigidly connected to the enclosure by means of the end wall 161 and/or 163 which may extend to a side wall of the enclosure 54. For this purpose, internal stiffeners (not shown) may rigidly connect the enclosing wall 160 to the main enclosure 54.

Preferably, each of the two end walls 161 and 163 comprises the channel 62, the latter here allowing the passage of oil between the auxiliary enclosure 156 and the main enclosure 54.

The G− event illustrated in FIG. 7 shows that the oil has a trajectory 50 from each of the two auxiliary inlets 67 and this, up to the auxiliary outlet 74 which recovers the oil having an acceleration of approximately 5 g at the boundary 106.2.

Advantageously, the tank 400 according to the second embodiment, makes it possible to ensure a combination of two cyclonic movements within the auxiliary enclosure 156, this combination makes it possible to avoid variations in the volume of accelerated oil and to avoid variations in acceleration, thus, the oil in the auxiliary enclosure 156 is capable of easily reaching the acceleration of 5 g in the direction of the hydraulic control circuit.

Preferably, the tank 40 according to the first embodiment or the tank 400 according to the second embodiment of the present invention is obtained by additive manufacturing.

Advantageously, the turbomachine of the present invention is capable of ensuring continuous and secure operation of its variable pitch systems thanks to the main oil tank making it possible to ensure oil supply in order to supply such systems with oil without any presence of air and without interruption of supply during flight phases in zero or negative gravity.

The invention claimed is:

1. An oil tank for an aircraft turbomachine, comprising:
- a main enclosure configured to contain oil;
- an oil inlet mixed with air, arranged on the main enclosure;
- an oil outlet for connection to a lubrication circuit;
- an auxiliary enclosure comprising an enclosing wall, and two end walls adjacent to said enclosing wall, at least one of the two end walls comprising at least one oil passage with an interior of the main enclosure,
- at least one auxiliary inlet opening tangentially to the enclosing wall and passing through the auxiliary enclosure for connection to an auxiliary circuit; and
- an auxiliary outlet opening tangentially to a larger diameter section of the enclosing wall compared to that of the auxiliary inlet, said auxiliary outlet passing through the auxiliary enclosure for connection to the auxiliary circuit, the oil outlet being arranged on the auxiliary enclosure or on the main enclosure.

2. The oil tank according to claim 1, wherein the enclosing wall is integrally formed with the main enclosure, and said enclosing wall comprises a conical circular shape.

3. The oil tank according to claim 2, wherein the at least one auxiliary inlet opens tangentially to a smaller diameter section.

4. The oil tank according to claim 1, wherein the at least one oil passage is centrally positioned on the corresponding end wall.

5. The oil tank according to claim 1, wherein the at least one oil passage comprises a channel extending axially from the corresponding end wall inside the auxiliary enclosure.

6. The oil tank according to claim 5, wherein the at least one channel extends over at least 20% of a total axial extent of the auxiliary enclosure.

7. The oil tank according to claim 1, wherein the at least one auxiliary inlet is close to one of the two end walls.

8. The oil tank according to claim 1, wherein the auxiliary outlet is close to one of the two end walls.

9. The oil tank according to claim 1, wherein the enclosing wall has a conicity angle between 0° and 50°.

10. The oil tank according to claim 1, wherein the enclosing wall comprises a single conicity.

11. The oil tank according to claim 1, wherein the enclosing wall comprises two opposite conicities, the auxiliary outlet being located at a boundary between the two conicities.

12. The oil tank according to claim 11, wherein the at least one auxiliary inlet comprises an auxiliary inlet at each of the two axial ends of the two conicities.

13. The oil tank according to claim 1, wherein at least 80% of a volume of the auxiliary enclosure is located in a lower half of the main enclosure, when the oil tank is oriented in a normal mounting position.

14. The oil tank according to claim 1, wherein the enclosing wall has a main axis coaxial with the channel or inclined by less than 45° relative to said channel.

15. A hydraulic system for an aircraft turbomachine comprising:
- the oil tank of claim 1;
- the lubrication circuit of the turbomachine, hydraulically connected to the oil tank; and
- a hydraulic control circuit of at least one hydraulic actuator, hydraulically connected to the oil tank.

16. The hydraulic system according to claim 15, wherein the lubrication circuit is hydraulically connected to the oil inlet mixed with air and to the oil outlet, the hydraulic control circuit is hydraulically connected to the at least one auxiliary inlet and to the auxiliary outlet.

17. An aircraft turbomachine, comprising:
- an unducted propeller propelling an incoming air flow, said propeller comprising variable-pitch blades actuated by at least one hydraulic actuator; and
- the hydraulic system of claim 15, the hydraulic system configured to provide lubrication of the turbomachine and of controlling the at least one hydraulic actuator.

* * * * *